Sept. 26, 1967 D. W. MOGG ETAL 3,344,217
MANUFACTURE OF A LIGHTWEIGHT INSULATING PRODUCT
Filed May 26, 1966 3 Sheets-Sheet 3

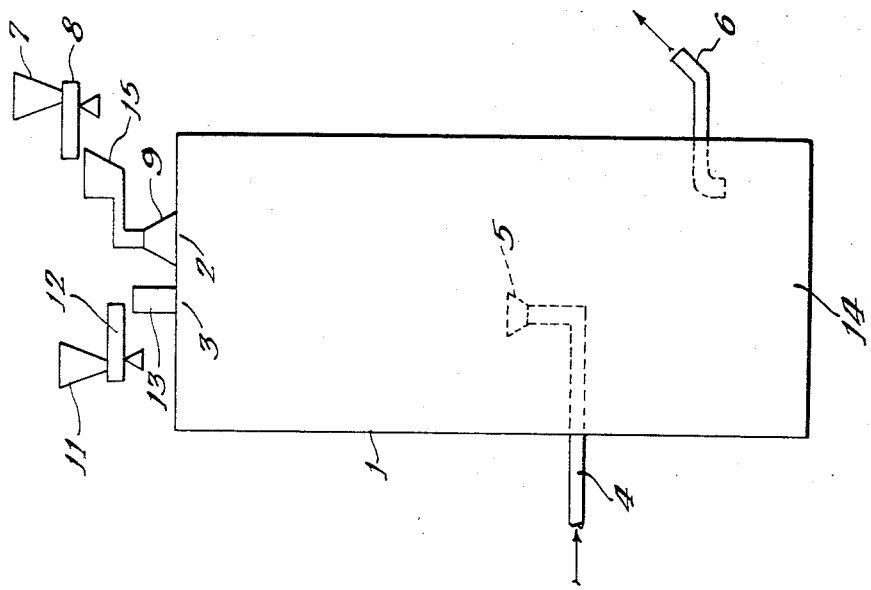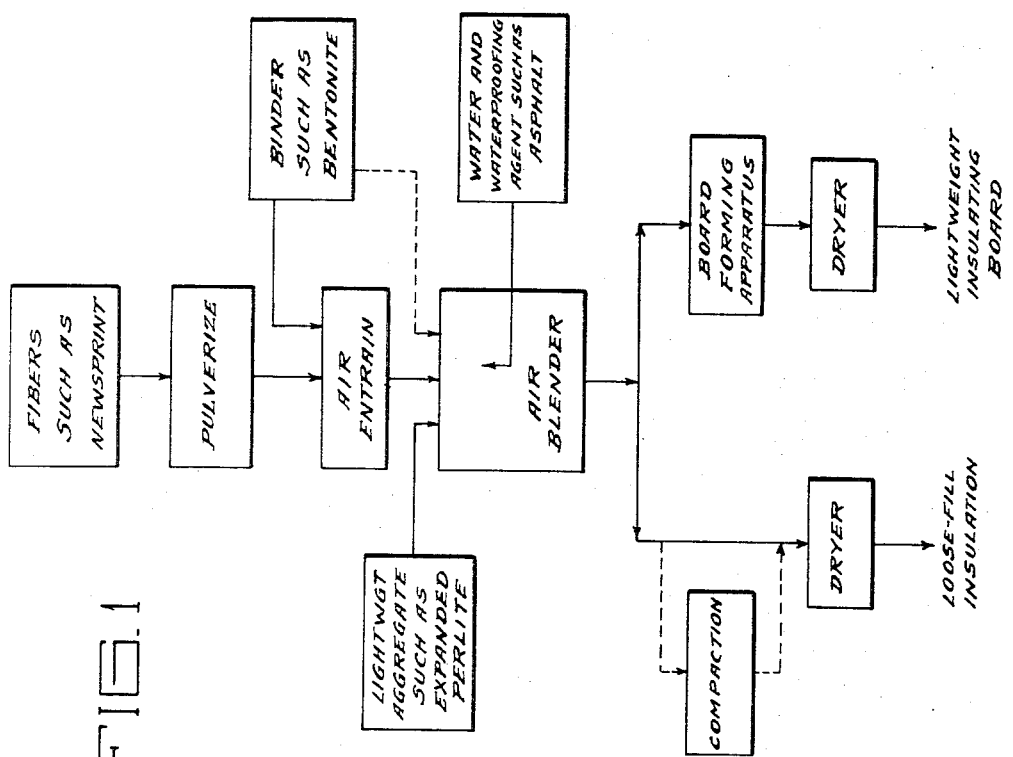

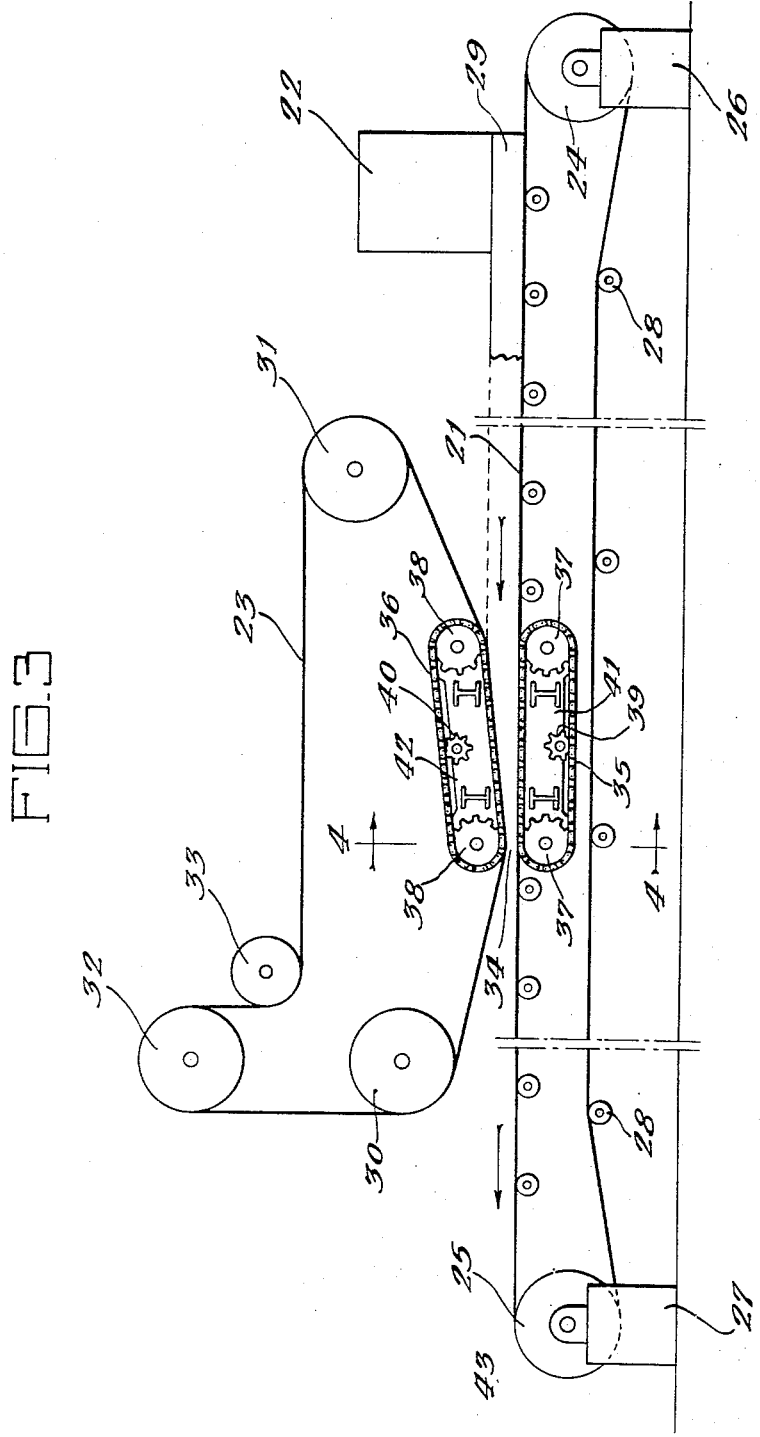

Inventors:
Frederick L. Shea, Jr.
Donald W. Mogg

United States Patent Office 3,344,217
Patented Sept. 26, 1967

3,344,217
MANUFACTURE OF A LIGHTWEIGHT
INSULATING PRODUCT
Donald W. Mogg, Elizabethton, and Frederick L. Shea,
Jr., Johnson City, Tenn., assignors to Grefco, Inc.,
Philadelphia, Pa., a corporation of Delaware
Filed May 26, 1966, Ser. No. 557,857
18 Claims. (Cl. 264—121)

This application is a continuation-in-part of our previously filed and now abandoned application, Ser. No. 242,383 filed Dec. 5, 1962 for Manufacture of a Lightweight Insulating Product.

This invention relates to a novel method of producing a lightweight thermal insulating product and to a process for blending the product components together. More specifically, this invention relates to the production of a lightweight building product composed of expanded perlite or other lightweight inorganic aggregate, fibers and (preferably) a nonfibrous binder.

Generally, the blending together of the components of a light weight insulating mix containing fibers and expanded perlite is carried out in one of two ways; either by a dry mixing operation or by the forming of a slurry. In the dry mixing process, the components are blended together by mechanical means such as stirring, tumbling or agitation. A mixture of nonuniform composition, characterized by fibrous agglomerates formed during or before the blending, usually results. In addition, much of the friable perlite or other lightweight aggregate is often crushed and its structure destroyed by the mixing. The resultant product whether loose-fill insulation or a formed shaped product, is nonuniform and generally of an inferior quality.

In the production of a shaped product, the problems of agglomeration of the fibers during mixing and of nonuniformity of the building product have been overcome by slurrying the components with a large quantity of water. This slurry, containing 95% or more (by weight) water is fed to a Fourdrinier board forming machine or other similar machine wherein most of this water is removed by draining and suction. This type of process suffers from the disadvantages that very large quantities of water must be handled, resulting in an increase in equipment and operating costs. Since all of the water must be removed from the final product, drying costs are excessive.

It is a principal object of this invention to produce a lightweight uniform composition suitable as a building product.

Another object is to produce such a composition without the necessity of handling large amounts of water.

It is another object of this invention to produce a lightweight insulating product or material containing fibers, and a lightweight inorganic aggregate such as expanded perlite (optionally with a nonfibrous binder), and having uniformity of composition throughout.

It is a further object of this invention to provide a method of substantially uniformly dispersing the fibers throughout this insulating product without agglomeration of the fibers or fracturing of the particles of the lightweight aggregate.

It is another object of this invention to produce a lightweight material suitable as a loose-fill insulation.

Another further object is the production of a shaped lightweight insulating product.

These objects, together with various other objects and features of the invention, will be more fully understood from the following description, and by reference to the accompanying drawings illustrating the preferred exemplary embodiments of the apparatus and process wherein:

FIGURE 1 is a block diagram of a preferred means of carrying out the process.

FIGURE 2 is a simplified drawing of an air dispersion mixer for uniformly blending the components of the lightweight product.

FIGURE 3 is a semi-diagrammatic view in sectional elevation of a board forming machine which may be used when the product desired is a shaped building board rather than loose-fill insulation.

Figure 4:
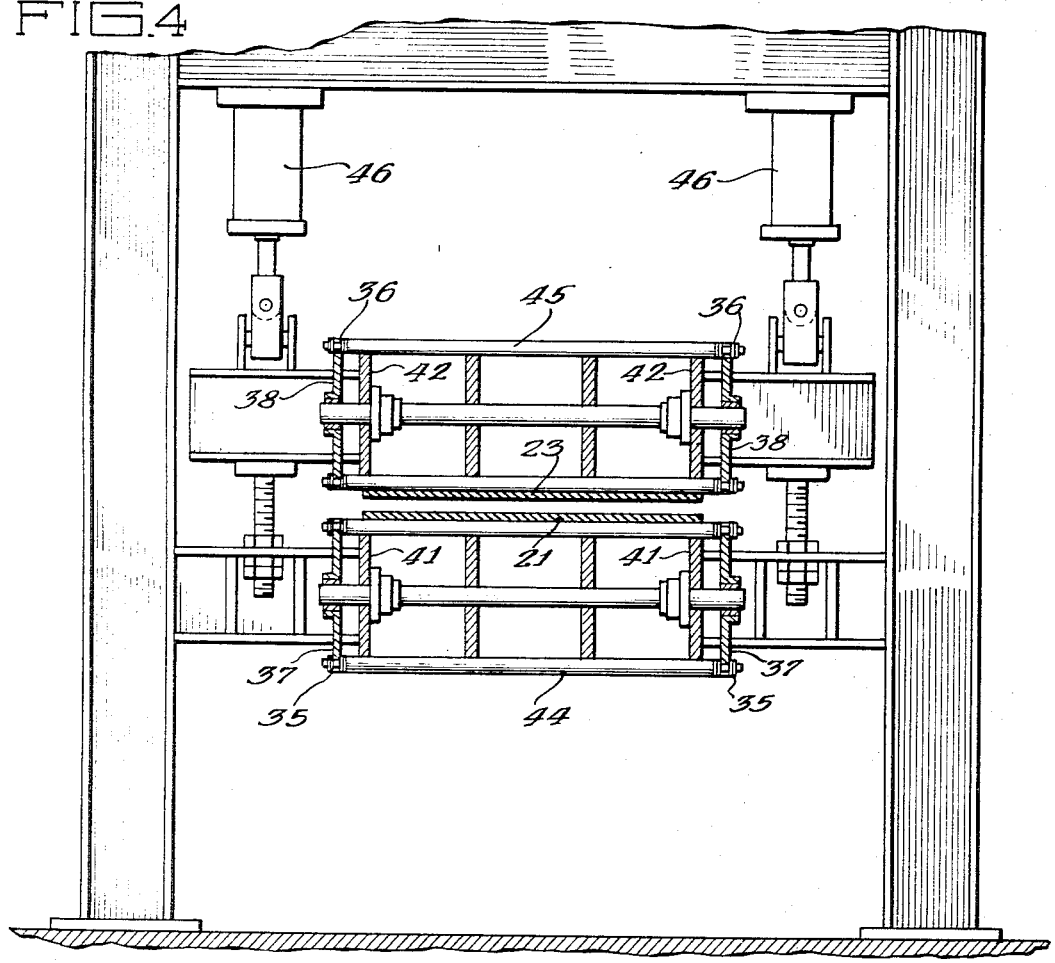
FIGURE 4 is a section taken along line 4—4 of FIGURE 3.

The aforementioned objects are accomplished by suspending a lightweight inorganic aggregate component into a gaseous medium, suspending a fibrous component consisting essentially of individual discrete fibers into a gaseous medium, blending the fibers and inorganic aggregate components together in the gaseous medium with controlled turbulence until they are substantially uniformly blended and to substantially prevent fiber agglomeration while maintaining sufficient void space to aid in uniformly blending components and to maintain the fibers in discrete form. An aqueous system is then added to the components dispersed in the gaseous medium to uniformly wet the components, followed by separation of the dampened blended components from the gaseous medium, after which substantially all of the water is removed from the blend.

Sufficient void space is maintained during the dispersion and mixing operation to ensure uniform blending of the components and to maintain the fibers in substantially discrete form or condition. Preferably, a void space of at least 90% is maintained but lower void volumes can be used, provided only that agglomeration of the fibers should not occur. The percentage void space is defined as 100 times the volume of gas in which the components are dispersed, divided by the sum of the two items consisting of the gas volume, plus the sum of the individual loose bulk volumes of the components being blended. Controlled turbulence of the gaseous medium is employed to facilitate blending. A nonfibrous binder is preferably included in the composition by suspending it into the gaseous medium and blending it together with the lightweight aggregate and the fibers.

More specifically, a light insulating material is generally produced from a mixture of about 5 parts to about 35 parts by weight of fibers such as cellulosic fibers, up to about 45 parts of a nonfibrous binder (more typically about 12 to about 40 parts of a clay binder) and about 25 to about 70 parts of a lightweight inorganic aggregate such as expanded perlite. The lightweight inorganic aggregate content may be raised for example to about 90 parts when the manufacture of certain form boards is contemplated. The preferred mixture is composed of from about 15 to about 35 parts of newsprint fibers, from about 12 to about 40 (preferably 23 to 32) parts of bentonite and from about 30 to about 55 parts of expanded perlite. The process comprises suspending an inorganic aggregate component, a binder component, a dispersed fibrous component into a moving air stream, blending these components together in the air stream before appreciable fiber agglomeration occurs, maintaining a sufficiently high volumetric percentage of air to the total blending space (preferably above 90%) to aid in substantially preventing fiber agglomeration, and in uniformly blending the components, introducing into the air between about 30 and about 700 parts, more typically about 65 parts to 500 parts and preferably about 100 to about 300 parts of aqueous system, retaining the aforesaid components and the aqueous system in air until they are all substantially uniformly blended, separating the blended components from the aid and removing substantially all of the water from the blend. Turbulent air means is used to facilitate blending of the component.

The lightweight insulating material may be rendered at least partially waterproof by contacting the components with from about 0.1 to about 20 parts of a waterproofing agent, more typically from about 2 parts to about 20 parts and preferably from about 5 to about 10 parts of asphalt, usually in the form of an emulsion.

If it is intended to produce a formed coherent shape, forming is generally carried out prior to the water removal. Preferably this forming is done by compressing the blend between two endless converging flexible belts, each belt usually backed up in the compression area by an endless chain of small closely spaced equally sized rollers, which in turn are backed up by rigid fixed support means. These small rollers preferably have a diameter of between ½" and 2" and may, if desired, be driven synchronously with the belts by suitable powering means.

If it is intended to produce a product such as loose fill insulation, the blend is dried with little if any prior compaction. These process and product alternatives are illustrated in FIGURE 1.

One type of apparatus in which the fibers, lightweight aggregate and non-fibrous binder (if used) can be blended and contacted with water and in which, in the preferred embodiment, a waterproofing agent is added, is represented in FIGURE 2. It comprises a large hollow tower 1 having an inlet means such as opening 2 through which the fibers are introduced, and an inlet means represented by opening 3 through which the expanded perlite or other lightweight aggregate is introduced. The water (typically in admixture with a waterproofing agent if it is to be used) enters the tower via suitable means such as pipe 4 and is sprayed upwardly through spray nozzle 5, or is otherwise suitably contacted with the downwardly falling dry components. A large vent tube 6 extending from within the tower to the atmosphere is used to vent off the air or gas entering through the fiber or other inlets, and to maintain the desired pressure within the tower. The tower 1 is so designed as to provide little or no "dead space" and a minimum of areas or locations where the material can "hang up" or stick on the walls during its descent. Desirably, a substantially unobstructed path should be provided for the descending material.

The fibers, such as previously shredded and ground newsprint, are fed into hopper 7 mounted atop the tower. A vibratory feeder 8, in connection with the hopper, feeds the newsprint into a duct 15 leading to an air entrainment and milling device, such as an air swept hammer mill 9. The comminuting action of the rotating hammers in the mill deagglomerates the fibers and substantially surrounds the discrete fibers with air. These discrete fibers, while surrounded by the air, are then swept into the tower by the movement of the hammers and the air. The lightweight expanded perlite is fed from a hopper 11 by any suitable feeding apparatus such as a vibratory feeder 12 and falls into the perlite inlet tube 13 and then into the tower mixer through the inlet 3. The stream of perlite and fibers preferably converge soon after entering the tower.

The method of feeding the nonfibrous binder into the tower is largely dependent upon its properties, the amount used and the nature of the other components. It is preferably fed along with the newsprint into the feed hopper 7 of the hammer mill whereupon it is swept into the tower through the mill. Alternatively, it may be fed into the hopper 11 along with the expanded perlite, or directly into duct 13 and/or duct 15. Still another method is to separately feed it into the tower from a hopper such as the one used for the perlite, in the same manner as the perlite. Spraying is also contemplated as a method of feeding when the binder is in the form of a liquid, emulsion, dispersion, etc. However, this binker may be omitted completely if its presence in the final product is unnecessary and the binding properties of the fibers are sufficiently strong to give a satisfactory product.

The thoroughness of the blending within the tower 1 without the undesirable agglomeration of the fibers is achieved by a combination of several factors: The controlled turbulent action created by the means used to feed the fibers into the tower; the maintaining of a high air/solids ratio; and the commencement of the blending of the components immediately after the fibers are distributed into the air. The extremely light density of the expanded perlite renders it quite susceptible to the movement of the air entering the tower, thus permitting a certain amount of turbulence and agitation. However, the turbulence created by the movement of the air and fibers through the mill and into the tower is preferably maintained at a sufficiently low level to minimize the shattering or fracturing of the very friable perlite particles. Such fracturing, if allowed, could occur by contact of the perlite particles with one another, with the other components, or with the apparatus itself. If the swirling, agitation or turbulence within the tower mixer is not violent or excessive, thorough and uniform mixing of the components is attained without substantial breakdown of the perlite or other aggregate. Likewise, the velocity of any air moving through the tower is preferably kept sufficiently low to minimize fracturing of the perlite particles. Since the thoroughness of the blending and the prevention of fiber agglomeration are not necessarily dependent upon the use of high air velocities which would fracture the friable perlite particles, the use of excessively high velocities should be avoided.

The respective feed rates of the perlite, the binder and the fibers are adjusted in relation to the air in and entering the tower and to the size of the tower employed to insure that a sufficiently high air to solids ratio is maintained to preclude the possibility of any appreciable agglomeration of the fibers and particles, to further protect against substantial fracturing of the expanded perlite, and to insure uniform and thorough mixing of these components.

Generally, the void space must be sufficient to substantially prevent agglomeration of the fibers. The volumetric percentage of blending air to total blending space is preferably maintained at above 90% but in some cases can be as low as 60%. A determination as to whether or not the fibers are agglomerated prior to final deposition and consolidation of the mixture can readily be made by taking samples from the gas-blended components suspended in the mixing tower or, from an area wherein the components are being blended in a gas stream of relatively high velocity as subsequently described herein. In the latter case, as previously stated, excessive velocity of the gas stream should be avoided to minimize or prevent fracturing of the friable perlite particles.

The amount of air entering the tower (through the hammer mill, perlite inlet, etc.) as compared to the feed rate of the components should be maintained at an optimum level determined by such factors as production rate, size of the tower, etc. If the air flow rate is too great, excessive fracturing of the lightweight aggregate will occur and the retention time of the components in the air will be too short, resulting, in inadequate blending. If the rate is too small, the retention time is prolonged thus reducing production rates.

It is not, however, always necessary that air be entering the tower. For instance, where the means, such as a hammer mill, for separating the fibers and surrounding each of them with air, is within the tower, outside air is not needed in order to obtain a uniform blend.

Water, and in a preferred embodiment, a waterproofing agent such as asphalt as an emulsion, is introduced into the other components in the air within the tower. This water or emulsion enters the tower by means of a pipe extending through the wall or bottom thereof or by other suitable means, and is sprayed upwardly through nozzle 5, preferably located at or near the axial center of the tower. Any nozzle or spray means is suitable for the purpose so long as the spray pattern and degree of atomization which it provides are such as to insure uniform and thorough contacting and coating of the descending particles and fibers and yet preclude or minimize contact of the water or emulsion with the sides of the tower. The nozzle is preferably located so that there is adequate room above it for at least partial blending of the components prior to their contact with the water or emulsion. Of course, any number of nozzles or spray means may be used in any suitable arrangement, our invention not being limited to a singular nozzle.

It is not essential that the spray be directed in an upward direction. The water or emulsion can instead be sprayed in horizontally from the sides of the tower, or in a downward direction. Steam may be used in place of or in addition to the water. Also, in certain instances it is desirable to add water to one or more of the components prior to the introduction of the component(s) to the tower.

After contact with the water and waterprofing agent (if used), the components descend into the lower portion 14 of the tower with continued blending and then through suitable discharge means for further processing. This blend as it is withdrawn, is not in the form of a slurry nor does it even appear wet. At most, it is only slightly moistened by the addition of water. This feature is accounted for by the inherent ability of one or more of the individual components each to absorb a sizeable quantity of water. The homogeneous blend is then ready to be compacted into suitable shape and dried, or alternatively, dried with or without prior compaction for use as a loose fill insulation.

The air mixing tower 1, although pictured as a vertical cylinder, is not limited to this shape but may be of any configuration suitable for the purpose of substantially preventing fiber agglomeration and of thoroughly blending the components. For instance, a conical or pyramidal container having sides tapering outward from top to bottom can be used. Spherical and semi-spherical containers can also be employed, as well as rectangular shapes. In designing such a container, it is desirable that "dead spots" and air pockets be avoided. It is also desirable to eliminate ledges, abutments and crevices so as to minimize or prevent accumulation of material as it moves through or descends in the container. Vibration of the walls or sides can also be employed to further prevent the collection of material thereon. In certain instances, heating of the tower may be necessary to insure proper blending, waterproofing, bonding, etc. The relationship of the height of the container to its other dimensions is not fixed but is dependent upon such factors as production rates, types of feed components, whether the blend is being discharged directly on to a board forming belt, etc.

The means for exhausting the air from within the tower is not limited to the vent tube as shown in FIG. 2. Means such as an exhaust blower can be used. If desired, the tower can be provided with a foraminous bottom, preferably consisting of a moving foraminous belt, said bottom serving both to collect the final blend and to provide a vent for the air. The space below the foraminous collection zone can be exhausted by use of an exhaust blower, as a means of ensuring that there is no appreciable pressure build-up within the tower. As still another alternative, the tower can be operated at appreciably above atomspheric pressure, if desired, but positive feeding means must then be used for feeding all of the materials into the tower. If the air flow is entirely internal with no outside air entering the tower, then the vent means may be eliminated.

The invention is not limited to the feed means and method of fiber deagglomeration as exemplified in the diagram, but other means of feeding the materials to the tower and deagglomerating the fibers may be used while still remaining within the scope of the invention.

The fibers such as newsprint may be chopped or put through a rough grinding operation rather than shredded. The chopping, rough grinding or shredding and the final grinding can be carried out in the same apparatus or the same step in which the fibers are entrained in the gaseous medium. In fact, any means which is suitably adapted for separating the fibrous component into individual fibers and surrounding them with air may be used in our invention. It is not necessary that the air or gaseous medium itself, or the velocity of the air assist in the deagglomeration of the fibers. It is sufficient if the air or gaseous medium be present to maintain the fibers in a discrete condition once they have been deagglomerated. However, if the fibers are of such a nature that they are capable of being deagglomerated solely by the action of a gas stream, the use of mechanical deagglomerating means may be omitted. Still another alternative is to carry out the deagglomeration within the tower itself and to surround the individual fibers with air already present in the tower. Furthermore, the fibers may be introduced into the tower at a point or points along its sides rather than, or in addition to the preferred method of feeding into the top.

The lightweight aggregate, fibers and other solid components may also be introduced into the tower by means other than those previously described, as long as a relatively good distribution within the tower is achieved. For instance, one or several of these components may be suspended into an air stream on the intake or exhaust side of a blower. If on the intake side, the components pass through the blower and are conveyed and mixed by the gas stream to the mixing chamber; if on the exhaust side, a seal valve can be used to introduce the components into the gas stream which mixes them and conveys them into the top or side of the tower; or they may be fed through several inlets in the upper portion of the tower. Another alternative is to feed them onto an impeller or other mechanical device either within or outside of the tower which device distributes them within the tower. Fans or other means may be used either inside or outside of the tower to assist in blending and creating controlled turbulence.

The blending of the lightweight components can be carried out by any number of other means not hereinbefore mentioned without departing from the scope or intent of the invention. For instance, the fibers can be dispersed in a flowing stream of air in an elongated conduit or duct. The other components and the aqueous system are then added and blending occurs at points downstream from the fiber addition. The order of addition can be varied, for instance by adding the fibers to the other components already flowing in the duct. Furthermore, the process is not limited to the use of one duct. For example, each component can be fed into a separate duct and can be conveyed by pneumatic, gravitational or other means to a point or points at which the ducts converge or discharge into a larger duct or container.

Water or the aqueous system may be incorporated into the blend either in the duct or in a subsequent vessel or container before the separation of the blend from the air. As an example of the latter, the blend could be discharged from a common duct, or each component from its individual duct into a container such as tower 1 and the water could be incorporated by spraying, etc., into the blend or components within the tower.

If it is desired to partially dry the mix prior to introduction to the board forming operation or to produce a lightweight, loose fill, insulating product, the mixture leaving the tower mixer may be conveyed to a suitable dryer, in which a part, or substantially all of the moisture is removed. Satisfactory drying means may consist of infrared lamps, radiant burners, horizontal air flow ovens, or any other type of dryer in which the moisture can be driven off at a temperature suitably adapted to dry the product without scorching of the fibers in the mixture. For instance, the loose fill material may be spread on a moving wire mesh belt in a relatively thick layer, and passed through an oven where it is dried by air forced through the layer.

If it is desired to produce a shaped lightweight insulating body rather than a loose fill insulation, several alternative means of compaction or shaping are available. One of these is shown in FIGURE 3, which is a sectional elevation of a preferred board forming machine employed in the process of this invention, and in FIGURES 4 and 5 which bring out various features of the machine in greater detail.

The lightweight blend may be fed directly from the mixing tower to the board forming machine, or may be withdrawn from the tower and (with or without an intermediate processing or drying step) introduced into a suitable feeding means such as a head box 22. If a direct discharge from the tower is contemplated, the tower is preferably physically positioned over the machine and the blend fed directly to the lower belt 21. The turbulence and air velocity in the tower during the blending are generally insufficient to cause any substantial disturbance of the blend already deposited on the belt.

Suitable means such as adjustable feed gates or rakes may be positioned relative to the discharge of the tower, or attached to the head box (if it is used) to make certain that the mix is distributed across the width of the belt in such a manner that the final product is of a uniform density.

The upper belt 23 and the lower belt 21 move in the direction indicated by the arrows and at substantially the same speed. Belt 21 is suspended between two pulleys 24 and 25, mounted on blocks 26 and 27. Tension rollers, such as the two represented as 28, serve to maintain the tension of the lower belt. Driving means (not shown) such as an electric motor, are provided at either pulley 24 or 25 or both and serve to drive the belt in the direction of the arrows. The upper belt moves over three large pulleys, 30, 31 and 32, and under one smaller pulley 33. One of the pulleys is driven by a suitable motor means, such as an electric motor which is synchronized so as to drive the upper belt at the same speed as the lower belt. However, by appropriate gear arrangement, both belts can be propelled by a common source of power.

During the board forming operation, the lightweight mix typically is subjected to a pressure of between about 30 and about 200 lbs. per square inch in order to consolidate the mass sufficiently to make it coherent and to produce a board of the desired density. Appropriate containing sidewalls 29 on the press extend at least part way into the compression zone to allow for the compression of the mix without loss by flowing or extruding from between the belts. The ultimate thickness of the board is primarily determined by the minimum spacing of the two belts varied by the resiliency of the board emerging from the press and by the expansion or contraction of the board during drying. In the particular embodiment illustrated in FIGURE 3, this minimum spacing occurs at 34, after which the two belts diverge. However, it is not necessary that they immediately diverge, but alternatively, the belts may move along together for some distance at minimum spacing prior to diverging.

Figure 5:
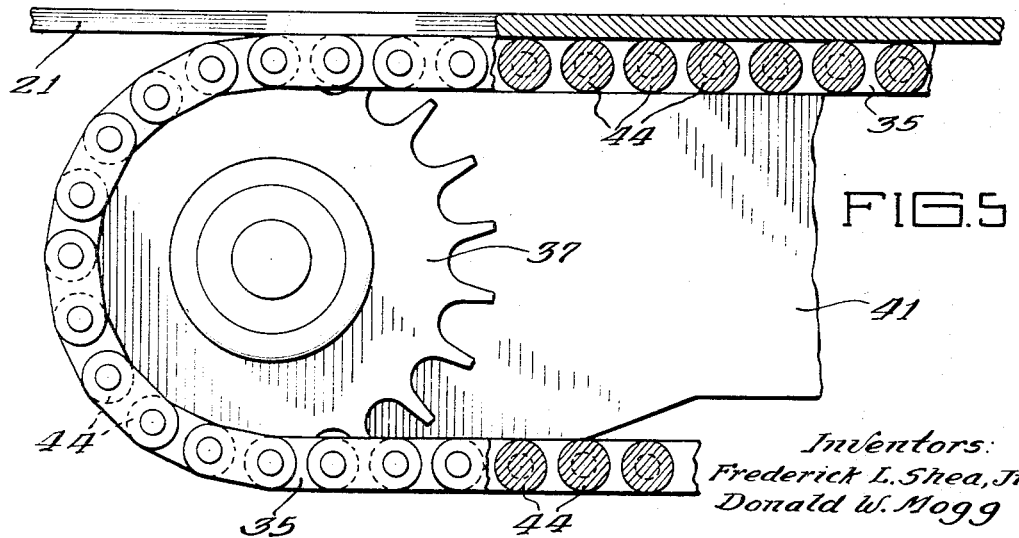
FIGURE 5 is an enlarged fragmentary view, partially in section of the lower belt mechanism shown in FIGURE 3.

The belts used in the machine do not, by themselves, have the rigidity and support necessary to produce a satisfactory board. Because of their flexibility, they produce a weak, crumbly board containing many cracks and fissures. To eliminate this shortcoming, solid backup plates have been tried as support for the belts in the compression area. However, the frictional drag resulting from the belts moving over the solid plates results in rapid deterioration of the belts and strain on the power supply and otherwise limits the usefulness of this alternative. These problems are overcome by the use of two endless chain supports, 35 and 36, behind the compression zone of each belt, 21 and 23. Referring to FIGURES 4 and 5, it can be seen that each chain consists of a connected series of closely spaced, small, equal diameter metal rollers 44 and 45 extending at least the width of the belt. The diameter of the rollers is typically less than 2" and preferably between ½" and 2". These chains ride on sprockets 37 and 38 and each chain is equipped with a tension adjusting sprocket 39 and 40 and, if desired, driving means (not shown). The rollers, in turn, are in contact with solid back up members 41 and 42. The use of these closely spaced rollers to transmit the pressure of forming from the belt to the backup means greatly reduces the frictional drag which would otherwise be encountered without the rollers, thus reducing the wear and tear on the belts, pulleys, motors and related parts.

The backup members 41 and 42 may be composed of solid plates of sufficient strength to receive the pressure transmitted to them by the rollers. Alternatively, and in the preferred form shown in FIGURE 4, they consist of a series of bars positioned substantially parallel to the direction of movement of the belts. The distance between the two backup members, and hence the distance between the belts 21 and 23 can be varied by mechanical, hydraulic or pneumatic means 46 operative on the upper belt assembly. This means may also vary the angle of convergence of the upper belt. By the use of the movable assembly, flexibility is imparted to the board forming process by permitting variations in the densifying pressures, the thickness of the board and the compression angle.

The board, after formation, is removed from the end 43 of the press, at or near pulley 25 after which it is conveyed to an appropriate dryer. Cutting or trimming of the board to final size may be carried out at any time after formation. Thus, the board may be sized while still on the lower belt 21. Alternatively, it may be transferred to another belt or support on which cutting or trimming is carried out. Still another possibility is to size the board after partial or complete drying. A wide range of belt speeds may be employed in the formation of the board depending upon such factors as rate of production desired, width of the belts, type and consistency of feed employed, type and efficiency of drying and ultimate desired density and thickness of the product.

The board as it emerges from the forming machine is generally very weak, the reason being that it contains an appreciable amount of moisture whereas the effectiveness of the binder is dependent upon the removal of moisture. Consequently, it is frequently expedient to subject the board to a preliminary drying treatment immediately after forming in order to increase its strength sufficiently so that it can be further handled without cracking or disintegrating. Preferably this preliminary drying step is of short duration.

During the preliminary drying period, preferably lasting no longer than a few minutes, air or gas temperatures as high as 350° C. may be safely approached without the danger of seriously scorching the organic fibers in the board. Of course if no organic constituents are present in the board, for instance where inorganic fibers such as asbestos are used, then this temperature limitation is inapplicable, and temperatures in excess of 600° C. can often be employed. Furthermore, if a light amount of scorching or charring of the board surface does not impair its usefulness or salability, preliminary drying temperatures above 350° C. may sometimes be used even when organic constituents are present.

The final drying operation can be carried out in any suitable apparatus, such as a single or multiple deck dryer. Infrared lamps or other radiant heating or electrical heating means may be employed, or alternatively, gas heating means, such as radiant gas burners, may be used. However, the preferred practice is to dry using heated air in an apparatus such as a horizontal air flow oven. When the board contains organic components, the board surface is generally kept below 235° C. and preferably below 200° or 220° C, in order to prevent decomposition or scorching of these components. This temperature limitation is unnecessary where the board contains no organic components. The heating typically is continued until the moisture content of the board is reduced to less than five percent by weight of the product.

The heating to remove the water is a necessary step in producing a strong coherent product when a clay binder such as bentonite is used. The effectiveness of such a binder is dependent upon the physical change which it undergoes during dehydration.

Generally, the heating is also necessary to render the water-proofing agent effective particularly where asphalt, the preferred agent, is used. Up until the time that the blend is heated, the asphalt is present, not as a uniform coating over the components, but rather as discrete particles or droplets interspersed throughout the blend. Heating causes the asphalt to melt or soften and to at least partially coat the components. In a formed product such as the building board, the asphalt serves to make most of the surfaces of the interstitial passages water repellent, thus waterproofing the board integrally rather than merely on the surface.

Where large amounts of water are used in the formulation of the lightweight product (e.g. 700 parts of water per 100 parts of components), some of this water can be squeezed out of the blend when it is compacted into a shaped product and thus does not have to be removed during the subsequent drying operation.

The board may be given further treatments either during or subsequent to the forming operation to improve its physical properties, enhance its appearance or render it easier to handle, etc. Accordingly, the board can be faced with paper or other materials, either on one face or on both, prior to or after drying. Dry powders, paints or plastic coatings can likewise be applied to the surfaces for decorative or functional purposes. Embossing of the board surface, or otherwise impressing or etching it with an ornamental design can also be done.

The expanded perlite used in the preferred embodiment of this process is derived from crude perlite ore typically found in the Western part of the United States. This ore is essentially a volcanic glass, having an approximate composition of about 65 to 75% of silicon dioxide ($SiO_2$), about 12 to 18% alumina, and about 1 to 5% combined water plus other minor constituents. To expand the perlite ore it is first crushed to a small particle size by grinding or other means. The sized ore particles are then rapidly heated to a temperature of between about 1300° F. and about 2100° F. to soften the volcanic glass and to vaporize a portion of the combined water contained therein. The pressure of the vaporized water causes the finely divided perlite ore to expand forming low density, cellular particles which, upon cooling, retain this low density structure. The loose bulk density of the expanded product may range from between about 1 and about 15 lbs. per cubic foot. The expanded perlite is chemically inert and is an excellent thermal insulator, having a typical thermal conductivity value (K) in B.t.u.'s per square foot per inch of thickness per hour per ° F. of between .20 and .22 as measured on a loose fill sample having a density of between 2.5 and 3.0 lbs./ft.$^3$. Sieve analyses of an expanded perlite suitable in the process of the invention show that about 90% by volume of the perlite is —8 and +100 mesh with about 40% to about 80% within the range between 20 and 50 mesh. Although the loose bulk density of the expanded perlite typically ranges between about 1 and about 15 lbs. per cubic foot, it is preferable to use the lighter weight products in the practice of our invention. Use of an expanded perlite with a bulk density of less than about 5.0, and preferably less than about 3.5 lbs. per cu. ft. results in a better loose fill or formed product than that which is obtained using a more dense perlite. The perlite may either be expanded at the site where the lightweight building product of the invention is to be produced, or be received at the site already expanded.

Although expanded perlite is the lightweight inorganic aggregate which is preferred in the teaching of the invention, it is by no means the only such material. Other minerals or glasses which contain water and are capable of expanding with the application of heat, or which are by nature porous and lightweight can be used either as a partial or as a total replacement for perlite in the production of the lightweight insulating product, by our process. Examples of some of these materials are pumice, volcanic ash and artifically expanded materials such as pitch-stone, obsidian, and vermiculite.

Waste newsprint, because of its low cost and relative ease of procurement, is a recommended fiber for the insulation product. Normally, the newsprint is first shredded, chopped or rough-ground and then pulverized in a suitable mill before being entrained in an air swept hammer mill or other apparatus used to feed the fiber to the mixing container. Of course, steps for the shredding, chopping, or rough-grinding, and pulverizing, deagglomerating and entraining in the air stream may be carried out individually or concurrently in a number of mills, grinders or comminuters or in a singular apparatus. In any case, the object of this processing is to separate the newsprint into its individual fibers and disperse these fibers in air without deleteriously affecting the individual fibers.

Other organic and inorganic fibers may be used in admixture with the newsprint or in place of it. Shredded wood such as excelsior, kraft or other non-newsprint paper, bagasse, cellophane, rags, bark, hemp, animal fibers and cotton linters are some of the alternative organic or vegetable fibers. Inorganic fibers such as asbestos, rock wool and glass, such as ½ or 1 inch chopped strand fibers, may also be used. Fibers with lengths exceeding 2.5 cm. may be employed in the production of our lightweight product. When using newsprint, fiber lengths of between about ½ mm. and about 2 mm. are typical.

We have found that water absorbent swelling clay, such as water swelling bentonite or other water swelling montmorillonitic clay is the most suitable nonfibrous binder in the process of the present invention for making the building product. Such a clay as Wyoming bentonite, for example processed by the American Colloid Company and marketed under the trade mark "Volclay" is particularly suitable. The mesh size of the clay does not appear to be critical; however, 200 mesh clay has been found very satisfactory. There are other organic and inorganic materials which may be used as a binder in place of or in addition to bentonite although, for the most part, they are not as satisfactory as bentonite either from a cost standpoint or because they lack the desirable binding qualities possessed by the bentonite. Some examples of these are resins and resin forming agents, sodium and potassium silicates, calcium, sodium or ammonium lignosulfonates, calcium sulfate (gypsum), portland cement, pitch, and starch. Although the binder is added as a solid in the preferred embodiments of the invention, it is contemplated that it can be sprayed into, or otherwise incorporated into the fibers and lightweight aggregate. Thus, where it is a liquid or a dispersion, the binder can be added along with the water and/or waterproofing agent, or may be added in a separate stream or step by atomizing, spraying, etc.

The use of a binder is not absolutely essential to the teachings of the invention, particularly in the production of loose fill insulation, and in board applications wherein the fibers and/or aggregate exhibit a high degree of coherency and binding. In those instances, the binder may be omitted from the formulation.

As a waterproofing agent, we have found that an asphalt emulsion is the most suitable material. One emulsion which we deem to be well suited for the purpose is produced by The Flintkote Company and is marketed under the name of Flintkote No. 51. However, it should be understood that the asphalt need not be in the form of an emulsion in order to be incorporated into the blend. For instance, it may be introduced into the mix in powdered form, or alternatively, may be distributed by hot spraying. The presence of asphalt does not interfere with the hydration of the bentonite and consequently the binding qualities of the latter are not adversely affected. Asphalt is not the only material which is suitable for waterproofing the components of the building products of this invention. Various waxes, linseed oil and drying oils, silicones, resins, latices, polyethylenes, stearates and oleates are but a few of the materials that can be used in place of the asphalt emulsion while still remaining within the confines of the invention. In addition to its primary function, it is possible that the waterproofing agent serves to a slight extent as a supplemental binder.

The step of waterproofing is not absolutely necessary in the teachings of our invention, especially where it is intended that a loose fill insulation be produced. Likewise, when a building board is to be used in applications which do not require a high resistance to water, waterproofing may be omitted.

An indispensable step of the process of producing a lightweight insulating product is the addition of an aqueous system to the components of the blend. The aqueous system consists of water, either alone or in combination with one or more of the components of the blend. The water can be combined as an emulsion, slurry, suspension or solution with the binder and the waterproofing agent. For instance, an aqueous sodium silicate solution or a suspension of a resin may be used as a binder. Likewise, an asphalt, a silicone or an oil may be mixed with the water for use as a waterproofing agent. Thus, the term aqueous system refers to and includes, water and any components added along with it to the tower or other blender.

When a clay binder is used, its hydration and dehydration resulting from the addition of, and subsequent removal of the water is necessary in developing the cohesive force. In the production of a board, the binder gives the product continuity and strength; in producing a loose fill insulation, the binder helps to reduce the amount of fines and tendency to dust, and makes the material easier to handle.

Because of the tendency of organic fibers such as newsprint to hydrate upon the addition of water, these fibers can serve as a bond between themselves and the inorganic material or aggregate. When this bond is sufficiently strong for the purpose intended of the product, the binder may be omitted completely from the product.

It is also within the contemplation of the invention that other materials may be incorporated into the mix in addition to, or in place of those already mentioned to impart special or additional qualities to the final product. Thus, other materials which serve as plasticizers, thickeners, foaming agents, gels, gums, surfactants, coloring agents, etc. may be incorporated into the board mix at any stage of the processing prior to or after the final drying of the mix. They could be mixed with the perlite, binders, fibers or waterproofing agent before introduction to the air dispersion chamber or they may be introduced separately in the same way as any of these components; or it is contemplated that these additives could be sprayed on or otherwise applied to the board mix in the forming machine, either prior to or subsequent to the compression step.

Some of the components which are selected for incorporation into the lightweight products may be particularly sensitive to the effects of air during the blending and the addition of water. To protect these components, the blending can be carried out in a gaseous medium other than air. Thus, an inert or other atmosphere can be maintained in the tower mixer and around the fibers where one or more of the components are susceptible to oxidation or decomposition, or are particularly flammable. In most instances, though, air is used as the gaseous medium.

To more fully clarify and exemplify the invention, but not with the intention of being limited thereby, the following examples are presented:

Example 1

Thirty-two parts by weight of shredded waste newsprint were comminuted into fibers having a length of approximately ½ to 2 mm. in a Model D Fitz Mill manufactured by the W. J. Fitzpatrick Company, and these fibers were mixed and charged into a hopper along with 30 parts of −200 mesh Wyoming bentonite. These materials were fed from the hopper by means of a vibratory feeder to a Raymond hammer mill which deagglomerated the fibers and dispersed them and the bentonite in a stream of air. Thirty-two parts of expanded perlite having a loose bulk density of 2.3 pounds per cubic foot and a particle size range of 91.8% −8 +100 mesh (U.S. Standard Screen) were fed into the top of a tower mixer, similar in shape to that shown in FIGURE 2, and having a diameter of 45″ and height of 16 feet. The stream of bentonite and fibers was introduced into the top of the mixer and directed at the entering perlite. The percentage of void space in the mixer, based upon the loose bulk density of the materials, was in excess of 95%. The high void space and the turbulence created by the air stream entering the mixer from the hammer mill resulted in a uniform blending of the components with little or no agglomeration of the fibers. The components were contacted with 6 parts of emulsified asphalt in 270 parts of water by spraying the asphalt emulsion upward in the tower countercurrent to the descending mixture. An examination of the material collected at the bottom of the tower showed no evidence of any balling or agglomeration of the fibers or fracturing of the perlite. A sample of the blend was placed in a 6″ by 6″ by 8″ mold to a depth of about 7″ and was consolidated into a 6″ by 6″ by 1″ panel on a laboratory scale hydraulic press at room temperature using a pressure of 53 pounds per square inch.

The panel was dried overnight in a gravity convection laboratory oven at a temperature of between 145° C. and 160° C. The dry board density of the panel was 12.7 lbs. per cubic foot, and the modulus of rupture was 89 p.s.i. as determined on a Dillon Model L. Universal Tester, using a loading rate of 1½ inches per minute and a span to thickness ratio of 3 to 1. Flexibility of the panel was 0.25 inch per foot as determined by the following procedure: A 4″ x 1″ x 1″ sample was placed in a clamp with 2½″ overhanging. A load was applied to the sample at a point 2″ from the clamp and was increased until the sample broke. The deflection at which the board cracked was measured at a point 1¼″ from the clamp. The percent compression was equal to 26 as determined by subjecting a 1″ square corner of a 2″ x 2″ x 1″ thick board to a compression load of 100 p.s.i. A 2″ x 2″ x 1″ piece of the test panel was cut and weighed and was then submerged in distilled water for a period of two hours with its top surface 1 inch below the surface of the water. The board was then removed, allowed to drain for ten minutes on a porous block and reweighed. It was found that the volume percent of water absorption was 3.2.

Example 2

Forty parts of expanded perlite, (loose bulk density of 2.3 pounds per cubic foot) 27 parts of newsprint, 25 parts of bentonite and 8 parts of asphalt in 300 parts of water were mixed according to the procedure employed in Example 1. This mix was fed to a board forming apparatus similar in design to that illustrated in FIGURE 3. The resultant board upon drying and testing was found to have a density of 11.3 lbs. per cubic foot, a modulus of rupture of 75 p.s.i., a flexibility of .21 inch per foot, a percent compression of 30 and 2.3% water absorption.

Example 3

Forty parts of expanded perlite, having a 2.3 pounds per cubic foot bulk density, 27 parts newsprint, 26 parts of bentonite, and 7 parts of asphalt in 115 parts of water were mixed and then formed into a 6″ by 6″ by 1″ test panel using a forming pressure of 51 p.s.i. according to the procedures in Example 1. After drying, this panel had a modulus of rupture of 72 p.s.i., a density of 13.1 lbs. per cubic foot, a flexibility of 0.36, a 30% compression and a water absorption of 3.6%.

*Example 4*

Twenty parts by weight of waste newsprint fiber, prepared by pulverizing shredded waste newsprint in a Mikro Pulverizer, 26 parts of bentonite clay and 47 parts of expanded perlite particles (3 lbs. per cubic foot bulk density) were admitted into a relatively high velocity air stream on the suction side of a fan blower. The 3 components were partially blended while passing through the blower and blending was completed on the downstream side of the blower by passing the air-suspended components through a duct at relatively high velocity, while avoiding breakdown of the fragile perlite particles, and with controlled turbulence. The suspended, blended dry components were then admitted into the top of a tower (as shown in FIGURE 2, Ref. 1, in the drawing) in which the velocity of the air was substantially reduced and the blended components were permitted to fall freely, and downwardly through the tower. The ratio of the cross section of the duct leading from the fan blower to the tower, to the cross section of the blending tower was 1:46. Specifically, the I.D. of the duct in which the components were blended in a relatively high velocity air stream was 10 in. and the I.D. of the blending tower was 5 ft. 8 in.

To the downwardly falling blended components in the tower were added 7 parts of emulsified asphalt in 300 parts of water by spraying the asphalt emulsion downwardly in the tower.

An examination of the material collected at the bottom of the tower showed that the product had not been subject to balling or agglomeration of the fibers, and substantially no fracturing of the perlite aggregate had occurred during the blending operation. This product was suitable for the uses described in Examples 1, 2 and 3.

Alternatively, one or more of the components can be introduced into the air on the downstream or discharge side of the fan blower, for example by means of one or more seal valves. Many types of fibers agglomerate or mat together when passed through such a device and may not be adequately redispersed by the action of the air stream. Such fibers can be introduced by feeding them through another blower or an air swept hammer mill.

Having thus described our invention and the preferred way of carrying it out, but with no intention of being limited thereby, we claim:

1. A process of producing an insulating product containing fibers and a lightweight inorganic aggregate comprising suspending an inorganic lightweight aggregate component into a gaseous medium, suspending a fibrous component consisting essentially of individual discrete fibers into a gaseous medium, blending the fibers and aggregate together in the gaseous medium with controlled turbulence until they are substantially uniformly blended and to substantially prevent fiber agglomeration while maintaining sufficient void space to aid in uniformly blending the components and to maintain the fibers in substantially discrete form, introducing an aqueous system into the components dispersed in the gaseous medium, separating the blended components from the gaseous medium, and removing substantially all of the water from the blend.

2. A process of producing an insulating product containing between about 5 and about 35 parts by weight of fibers, between about 25 and about 70 parts of a lightweight inorganic aggregate and up to about 45 parts of a non-fibrous binder comprising suspending a lightweight inorganic aggregate component in air, suspending a non-fibrous binder component into air, suspending a fibrous component consisting essentially of individual discrete fibers into air and surrounding the fibers with air, blending the components together in air with controlled air turbulence until they are substantially uniformly blended and to substantially prevent agglomeration of the fibers while maintaining a void space of at least 90% to aid in uniformly blending the components and to maintain the fibers in substantially discrete form, introducing between about 30 parts and about 700 parts of an aqueous system, based upon 100 parts of the finished insulating product, into the components in the air, separating the blended components from the air and removing substantially all of the water from the blend.

3. A process of producing an insulating product containing fibers and a lightweight inorganic aggregate comprising suspending an inorganic lightweight aggregate component into a gaseous medium, suspending a fibrous component consisting essentially of individual discrete fibers in a gaseous medium, blending the fibers and aggregate together in the gaseous medium with controlled turbulence until they are substantially uniformly blended and to substantially prevent fiber agglomeration while maintaining a void space of at least 90% to aid in uniformly blending the components and to maintain the fibers in substantially discrete form, introducing an aqueous system into the components dispersed in the gaseous medium, separating the blended components from the gaseous medium, and removing substantially all of the water from the blend.

4. A process of producing an insulating product containing fibers, a lightweight inorganic aggregate and a non-fibrous binder comprising suspending the aggregate component into a gaseous medium, suspending the binder component into a gaseous medium, dispersing the fiber component consisting essentially of individual discrete fibers into a gaseous medium and surrounding the fibers with the gaseous medium, blending the components together in the gaseous medium with controlled turbulence while maintaining a void space of at least 90% until the components are substantially uniformly blended and to substantially prevent agglomeration of the fibers, introducing an aqueous system into the dispersed components, separating the blended components from the gaseous medium, and removing substantially all of the water from the blend.

5. A process according to claim 4 wherein a waterproofing agent is incorporated into the blend prior to the water removal.

6. A process according to claim 2 wherein the components are contacted with from about 0.1 to about 20 parts of a waterproofing agent prior to separation of the components from the air.

7. A process according to claim 6 wherein the lightweight blend is compacted into a coherent shape after separation from the air.

8. A process according to claim 7 wherein at least part of the water removal occurs prior to compaction.

9. A process of producing a lightweight building product containing between about 25 and about 70 parts by weight of expanded perlite, between about 5 and about 35 parts of a cellulosic fibrous component and between about 12 to about 40 parts of a clay binder comprising suspending a perlite component into air, suspending a clay binder component into air, dispersing the fibrous component consisting essentially of individual discrete fibers into air, blending the components together in air with controlled air turbulence until they are substantially uniformly blended and before appreciable agglomeration of the fibers can occur while maintaining a void space of at least 90% to aid in uniformly blending the components together, introducing into the air-dispersed components between about 65 parts and about 500 parts of water, based upon 100 parts of finished product, separating the water-containing blend from the air and removing substantially all of the water from the blend.

10. A process according to claim 9 wherein from about 4 to about 20 parts of a waterproofing agent is incorporated into the lightweight building product prior to the water removal.

11. A process according to claim 10 wherein the blend, after separation from the air, is formed into a coherent shape prior to the appreciable removal of the water.

12. A process according to claim 11 wherein the forming is carried out between two endless converging flexible belts and the water is removed by the application of heat.

13. A process according to claim 12 wherein each belt is backed up in the compression zone by an endless chain of small closely spaced equally sized rollers, which rollers are backed up by rigid fixed support means.

14. A process according to claim 13 in which the chains are driven and are synchronized to move with the endless belts.

15. A process of producing a lightweight waterproofed building product containing between about 30 and about 55 parts by weight of expanded perlite, between about 15 and about 35 parts of fibered newsprint, between about 23 and about 32 parts of bentonite clay and between about 2 and about 10 parts of asphalt, comprising suspending the perlite, bentonite, and fibered newsprint into air, blending these components together in air with controlled air turbulence until they are substantially uniformly blended to substantially prevent agglomeration of the fibers while maintaining a void space of at least 90%, introducing into the air-dispersed components between about 100 and about 300 parts of water and between about 2 parts and about 10 parts of emulsified asphalt, separating the water-containing mix from the air and removing substantially all of the water from the blend by heating.

16. A process according to claim 15 wherein the mix is compressed into a coherent shape between two endless converging flexible belts, each belt being backed up in the compression area by an endless chain of closely spaced equally sized rollers having a diameter of between about ½" and about 2", which rollers are backed up by rigid fixed support means.

17. A process of producing an insulating product containing fibers and a lightweight inorganic aggregate comprising establishing a relatively high velocity gaseous stream, suspending an inorganic lightweight aggregate component and a fibrous component consisting essentially of individual discrete fibers in said gas stream, blending the fibers and aggregate together in said gas stream with controlled turbulence until they are substantially uniformly blended and to substantially prevent fiber agglomeration while maintaining sufficient void space to aid in uniformly blending the components and to maintain the fibers in substantially discrete form, admitting the relatively high velocity gas stream containing said suspended components into an area wherein the gas velocity of the gas stream will be substantially reduced and which will permit the blended components to deposit on a surface at relatively reduced velocity, introducing an aqueous system into the components dispersed in the reduced velocity gas stream prior to the deposition and consolidation of said blended components, separating the blended components from the gaseous medium, and removing substantially all of the water from the blend.

18. A process according to claim 17 wherein a non-fibrous binder component is suspended in the relatively high velocity gas stream and blended with the aggregate and fibrous components.

No references cited.

ROBERT F. WHITE, *Primary Examiner.*

J. R. HALL, *Assistant Examiner.*